A. G. JILLARD AND S. BRACKEN.
MANUFACTURE OF INSULATING SUPPORTING BLOCKS.
APPLICATION FILED SEPT. 18, 1919.

1,396,759.

Patented Nov. 15, 1921.
3 SHEETS—SHEET 1.

Inventors
Annis G. Jillard
Stanley Bracken
by [signature]
Atty.

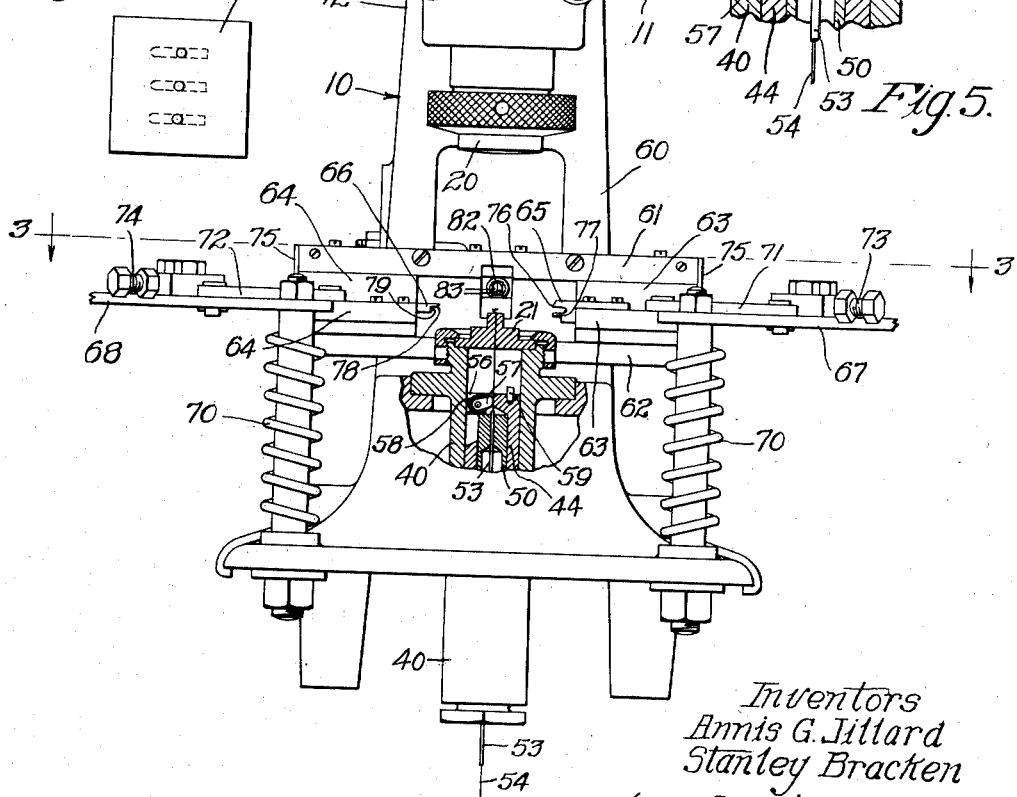

A. G. JILLARD AND S. BRACKEN.
MANUFACTURE OF INSULATING SUPPORTING BLOCKS.
APPLICATION FILED SEPT. 18, 1919.
1,396,759.
Patented Nov. 15, 1921.
3 SHEETS—SHEET 3.
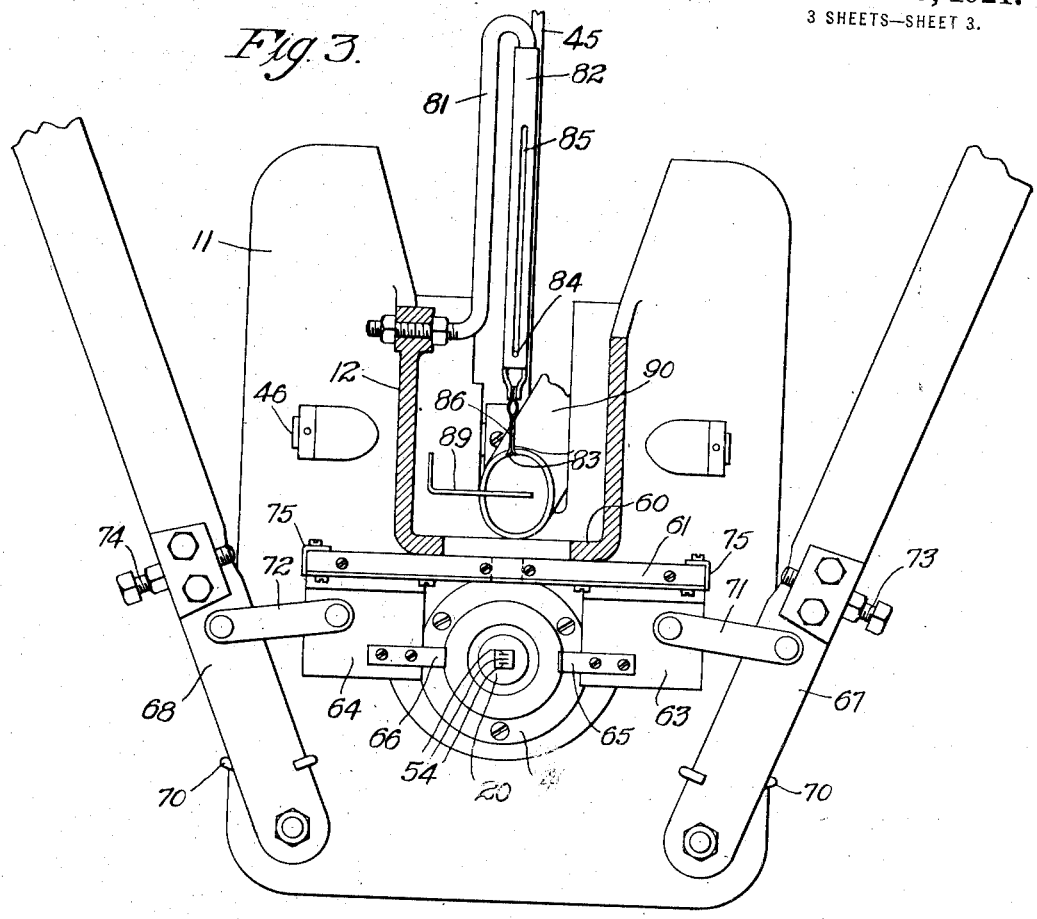
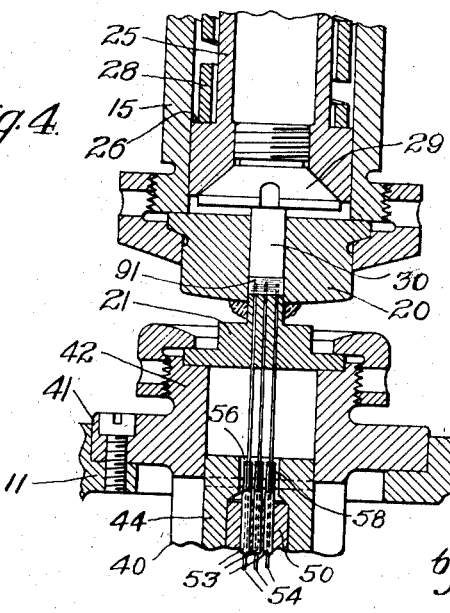
Inventors
Annis G. Jillard
Stanley Bracken

UNITED STATES PATENT OFFICE.

ANNIS G. JILLARD, OF BERWYN, AND STANLEY BRACKEN, OF CICERO, ILLINOIS, ASSIGNORS TO WESTERN ELECTRIC COMPANY, INCORPORATED, OF NEW YORK, N. Y., A CORPORATION OF NEW YORK.

MANUFACTURE OF INSULATING SUPPORTING-BLOCKS.

1,396,759.     Specification of Letters Patent.     Patented Nov. 15, 1921.

Application filed September 18, 1919. Serial No. 324,489.

*To all whom it may concern:*

Be it known that we, ANNIS G. JILLARD and STANLEY BRACKEN, citizens of the United States, residing at Berwyn, in the county of Cook and State of Illinois, and Cicero, in the county of Cook and State of Illinois, respectively, have invented certain new and useful Improvements in the Manufacture of Insulating Supporting-Blocks, of which the following is a full, clear, concise, and exact description.

This invention relates to the manufacture of insulating supporting blocks, and more particularly to the manufacture of glass blocks with metallic or wire inserts therein for supporting elements in a thermionic device.

One of the objects of this invention has to do with the method of producing the glass blocks by a molding operation in which the supporting wires are securely positioned in the block, thereby insuring a uniform product and one which may be easily and economically produced.

In carrying out the method of this invention the wire inserts are first prepared in their ends to give them good anchorage in the block and the block is then molded around the ends of the wires thus prepared. The wire inserts are drawn from continuous strands of wires and after the glass block has been molded around the prepared ends the projecting wires are cut to the desired length, and the ends of the strands are prepared for the succeeding block.

Another object of this invention is to provide a mechanism by means of which this method may be carried on in a practical and economical manner.

A mechanism for this purpose may comprise in general a pair of dies for forming plastic glass into the desired shape, operating in conjunction with wire feeding, cutting, bending, and block removing mechanism in such a manner that the operation is almost wholly automatic and may be carried on rapidly.

In the drawings illustrating this invention:

Fig. 2 is an end elevation thereof partly in section;

Fig. 3 is a plan section taken on the line 3—3 of Fig. 2;

Fig. 4 is a detail view of the forming dies just after a block has been formed;

Fig. 5 is a detail view of the forming dies in a retracted position after the block has been formed and the associated parts operated;

Fig. 6 is an enlarged end elevation of the completed block, and

Fig. 7 is a bottom view thereof.

Figure 1:
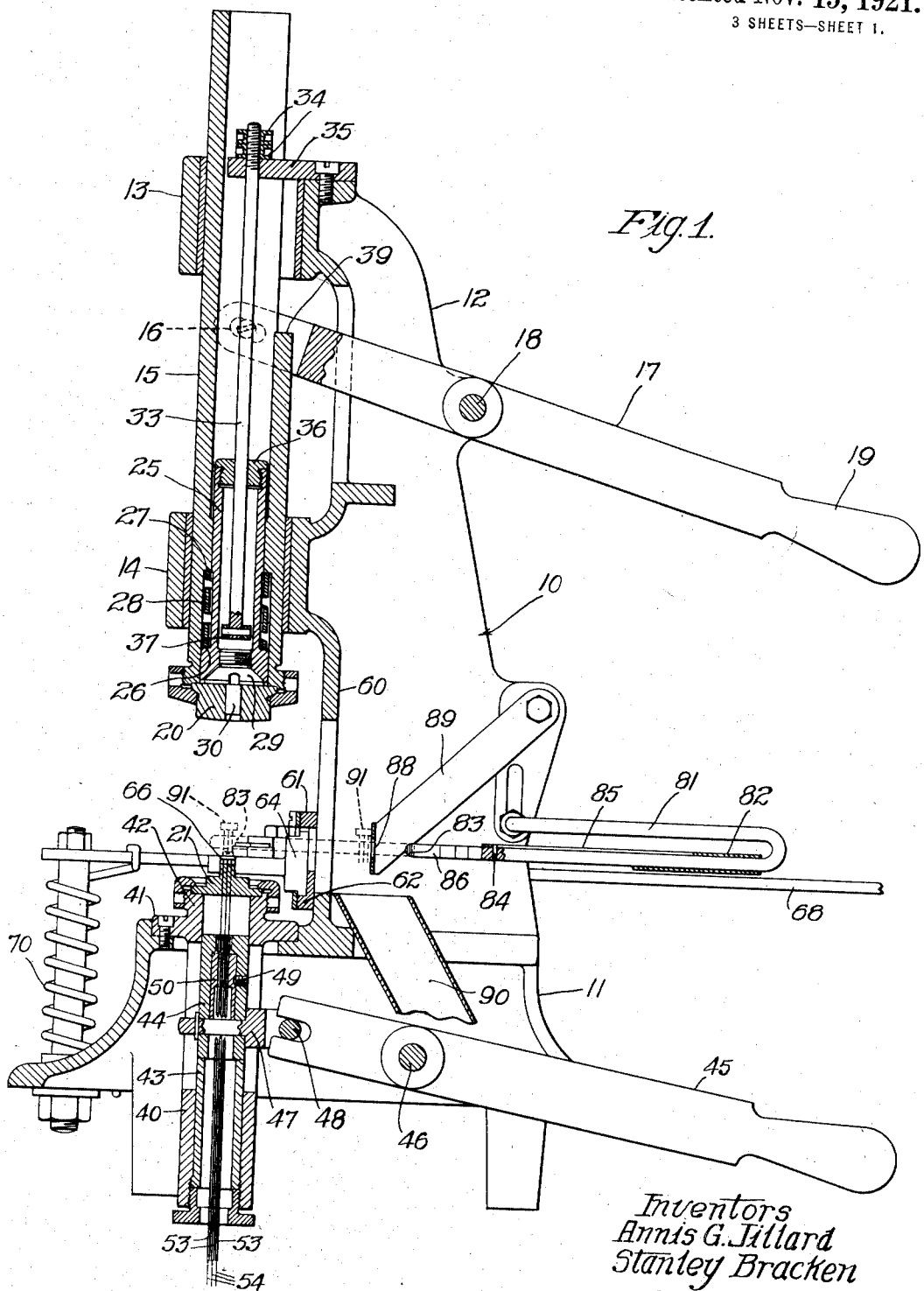
Figure 1 is a side elevation partly in section of the complete machine.

As shown in the drawings, 10 is a supporting frame for the dies and tools. Extending upward from a base 11 of the frame 10 is a standard 12 which is equipped with bearing bosses 13 and 14 and in which rides a sleeve 15. Suitably pivoted to the sleeve 15 at a point 16 intermediate its ends is a lever 17. The lever 17 is suitably pivoted to the standard 12 at a point 18 thereon and is provided with a handle portion 19. The sleeve 15 at its lower end has suitably secured thereto a die 20 which forms the upper and movable part of a block forming die. A lower and stationary punch 21 of the block forming die is suitably secured to the base 11. Mounted in the lower end of the sleeve 15 is a slidable sleeve 25 equipped with an external shoulder 26 near its lower end. Mounted around the sleeve 25 and between the shoulder 26 thereon and an internal shoulder 27 on the sleeve 15 is a compression spring 28. Screw threaded into the lower end of the sleeve 25 is a cap 29 which has suitably secured thereto a pad 30. Movement downward of the sleeve 15 carrying the die 20 is limited by an adjustable stop rod 33 located centrally with respect to the sleeves 15 and 25. The stop rod 33 is screw threaded at its upper end for the reception of adjusting nuts 34, 34 which rest on the top surface of a supporting plate 35 secured to the upper boss 13. The lower end of the stop rod 33 passes through a cap 36 screw threaded into the upper end of the sleeve 25 and is equipped with a head 37 at its lower end. When the handle 19 is moved in an upward direction the sleeve 15 will be moved down and, through the spring 28 between the shoulders on sleeves 15 and 25, will cause the sleeve 25 to be moved down. The downward movement of the sleeve 15 and consequently of the die 20 is arrested by the lower surface of the cap 36 coming into engagement with the head 37 on the stop rod 33.

The downward movement of the die 20 is adjusted to permit a slight relative movement of the pad 30 and die 20 when forming a block. This occurs when the downward movement of the sleeve 25 brings the head 37 of rod 33 into engagement with the cap 36 on the sleeve 25, thereby causing the sleeve 15 to move relative to the sleeve 25 and permitting also a movement of the die 20 relative to the pad 30. The sleeve 15 is cut away at its upper end as indicated at 39 to allow for its movement relative to the supporting plate 35 which supports the stop rod 33.

Mounted from the base 11 and extending downwardly from a shouldered opening therein is a sleeve 40 provided with a flange 41 suitably secured in an opening in the base 11. A part 42 of the sleeve 40 which projects above the flange 41 has suitably secured thereto the punch 21 of the block forming die. Screw threaded into and suitably secured in the lower end of the sleeve 40 is a sleeve 43. Normally resting on the sleeve 43 is a slidable sleeve 44 which acts as a wire carrier and is raised and lowered by operating a lever 45 which is pivoted to the base 11 at a point 46 and is operatively connected to the sleeve 44 by a suitable collar 47 and a pin 48. Secured within the sleeve 44 by a set screw 49 is a sleeve 50. Secured in the upper end of the sleeve 50 and depending therefrom are three wire guide tubes 53—53 through which three wires 54—54 to be embedded in the block are guided from a supply source below the machine. The upper end of the sleeve 44 is closed except for an opening 56 which is cut therein to one side of the center and in which are suitably pivoted three wire gripping fingers 57—57 which are always in engagement with the three wires 54—54. (See Figs. 4 and 5.) Each finger 57 is acted upon by a leaf spring 58 which causes the finger to press the wire 54 against the wall of the opening in the upper end of the sleeve or carrier 44 when the carrier is moved up. When the handle of the lever 45 is operated downward the wire carrier 44 will be moved up, and through the action of the fingers 57 the wires 54 will be gripped and moved up through the punch 21 the required distance. The movement upward of the wire carrier 44 is limited by a stop pin 59 secured in the carrier 44 coming into contact with the lower side of the punch 21. On moving the wire carrier 44 downward the wires 54 will not be moved with it. This is due to the mounting of the fingers 57 and the springs 58 which acts to grip the wires only on an upward movement of the carrier 44, and also partly due to the formed ends of the wires resting against the top surface of the punch 21.

A suitable opening is formed in the sleeve 40 to allow for the movement of the collar 47 which is secured to the carrier 44.

Secured to a vertical wall 60 of the standard 12 are guide rails 61 and 62 upon which slide plates 63 and 64. The plates 63 and 64 have suitably mounted thereon wire clipping and forming dies 65 and 66. For operating the clipping and forming dies 65 and 66 there are provided levers 67 and 68 which are suitably pivoted to the base 11. The levers 67 and 68 are returned to their normal position after being operated and released by suitably mounted springs 70. Connecting the levers 67 and 68 with the plates 63 and 64 are links 71 and 72. The movement inward of the levers 67 and 68 and consequently the dies 65 and 66 is adjusted by regulating stop screws 73 and 74 suitably secured on the levers 67 and 68. When the levers 67 and 68 are moved inward the stop screws 73 and 74 engage connecting strips 75 which connect the guide rails 61 and 62. The die 65 is provided with a cutting edge 76 and a forming tongue 77 and the die 66 is provided with a cutting edge 78 and a forming depression 79 which are best shown in Fig. 5. When operating the levers 67 and 68 the operator will move the lever 67 a little in advance of the lever 68 so as to bring the die 65 into contact with the wires 54 a little in advance of the die 66 to facilitate the cutting and forming of the wires. When the dies come together the wires are first clipped or cut and the end from the supply source follows the cutting edge 78 of the die 66 and is bent over under the cutting edge 76 of the die 65. The forming tongue 77 now forms the wires in the forming depression 79 which gives them a U-shaped end. After the wires are clipped and formed the levers 67 and 68 return to their normal position under the action of the springs 70.

On a plane just above the dies 65 and 66 and operating at right angles to their movement is a mechanism for removing the finished block after the wires have been clipped and formed. This mechanism comprises a supporting rod 81 adjustably mounted for vertical movement on the standard 12, and slidable thereon is a handle or tube 82 equipped at one end with spring gripping fingers 83. A pin 84 in the rod 81 projects into a suitable slot 85 in the tube 82 and keeps the tube or handle 82 from turning on the rod 81 and also limits its movement inward toward the center of the machine. The slot 85 is of a length which allows the fingers 83 to move inward enough so that flat surfaces 86 thereon will grip the wires.

The fingers 83 in moving toward the block to be removed pass through an opening 88 in a stripping plate 89 which is secured to the standard 12. On the return of the fingers 83 with the wires of the block therebetween the block will come into contact with the plate 89 directly above the opening 88 therein and on the continued movement of the fingers the finished part will be brushed from between the fingers 83 and dropped into a suitable fiber chute 90.

In Figs. 1, 2, and 3 the mechanism is shown in its normal position or just after completing a block 91 and with the wires for the next block in their proper position and their ends properly formed. Starting at this position the method of producing the blocks by this mechanism is as follows: An operator takes a stick of glass the end of which is in a molten state and places it over the U-shaped ends of the wires 54 projecting just above the stationary punch 21 of the block forming die. A second operator will immediately cause the movable die 20 of the block forming die to move down by moving the handle 19 of the lever 17 upward. This will bring the die 20 into the position shown in Fig. 4 with the glass formed around the U-shaped ends of the wires 54. The die 20 is now returned to its normal position and at the same time the wire carrier 44 is moved upward by pressing down on the handle of the lever 45, thereby moving the carrier upward until the stop pin 59 comes into contact with the bottom of the punch 20, as best shown in Fig. 5. This operation raises the block 91 from the top of the punch 21 to the position shown in dotted lines in Fig. 1. The gripping fingers are now moved out to grip the wires 54 below the block by sliding the handle or the tube 82 on the rod 81, as shown in dotted lines in Fig. 1. After the fingers 83 have gripped the wires the clipping and forming dies 65 and 66 are operated by moving the levers 67 and 68 toward each other about their pivots. At the end of their movement inward the dies 65 and 66 have cut the wires and formed the ends from the supply source for the next block to be formed. This position is clearly shown in Fig. 5. The dies 65 and 66 are now allowed to return to their normal position under the action of the springs 70 which act on the levers 67 and 68. The finished part is now held by the fingers 83. The wire carrier 44 is now moved down to its normal position as shown in Fig. 1 and the fingers 83 are moved back carrying the finished part which will be removed from between the fingers when the block 91 comes into contact with the plate 89 and will fall into the fiber chute 90 and then into a suitable receptacle. The mechanism is now in its normal position and ready to form another block.

What is claimed is:

1. The method of forming supporting blocks of the class described, which consists in preparing the ends of the wires with anchorage portions and molding a glass block around the ends of the wires so prepared.

2. The method of forming supporting blocks of the class described, which consists in preparing the ends of wires by bending them into hooks and molding a glass block around the hooked ends of the wires.

3. The method of forming supporting blocks of the class described, which consists in preparing the ends of continuous strands of wires with anchorage portions, molding a glass block around the ends so prepared, cutting the wires projecting from the block to the proper length, and preparing the severed ends of the continuous strands for another glass block.

4. In a mechanism for producing glass blocks with wire inserts, a pair of relatively movable dies between which the block is formed from plastic glass, means for operating said dies in a direction parallel to the length of the wire inserts, and means associated with one of the dies for holding the wires in position to have the glass molded around the ends thereof.

5. In a mechanism for producing glass blocks with metallic inserts therein, a pair of relatively movable dies between which plastic glass is molded to form the block, means for operating said dies in a direction parallel to the direction of movement of the metallic inserts, means associated with one of said dies for holding the metallic inserts in position to have the glass molded around the ends thereof, and means to feed the metallic inserts into position.

6. In a mechanism for producing glass blocks with wire inserts therein, a pair of dies between which plastic glass is molded to form the block, means for operating one of said dies, means associated with one of said dies for guiding the wires into position to have the glass molded around the ends thereof, and means to feed the wires into position through one of said dies from a supply source.

7. In a mechanism for producing glass blocks with wire inserts, a pair of relatively movable dies between which the block is formed from plastic glass, means for operating said dies in a direction parallel to the length of the wire inserts, means for guiding and feeding the ends of continuous strands of wires into position to have the glass molded around them, and means for cutting the wires below the formed block.

8. In a mechanism for producing glass blocks with wire inserts, a pair of relatively movable dies between which the block is formed from plastic glass, means for operating said dies, means for guiding and feeding formed ends of continuous strands of wires into position to have the glass molded around the formed ends, and means for cutting the wires below the formed block and for shaping the ends of the continuous strands of wire to be anchored in the succeeding block.

9. In a mechanism for producing glass blocks with wire inserts; a pair of relatively movable dies between which the block is formed from plastic glass, means for operating said dies, means for guiding and feeding the ends of continuous strands of wires into position to have the glass molded around the ends thereof, means for cutting the wires below the formed blocks, and means for removing the finished block from between said dies.

10. In a mechanism for producing glass blocks with wire inserts, a pair of relatively movable dies between which the block is formed from plastic glass, means for operating said dies, means for guiding and feeding the ends of continuous strands of wires into position to have the glass molded around the ends thereof, means for cutting the wires below the formed block, and means for gripping the wires below the formed block while they are being cut and thereafter to remove the block and wire inserts from over the die.

11. In a mechanism for producing glass blocks with wire inserts, a pair of relatively movable dies between which the block is formed from plastic glass, means for operating the dies in a direction parallel to the length of the wire inserts, wire feeding mechanism comprising a reciprocating member and wire gripping fingers adapted to grip and feed the ends of continuous strands of wires into position to be molded into the block, and means for reciprocating the wire feeding mechanism.

12. In a mechansim for producing glass blocks with wire inserts therein, a pair of relatively movable dies between which the block is formed from plastic glass, insert wires formed from continuous strands of wire, means for guiding and feeding the ends of the wire strands into position to have the glass molded around formed ends thereof, wire guiding and shaping mechanism comprising relatively movable dies adapted to cut the wires and shape the ends of the continuous strands of wire to be anchored in the succeeding block, and means for operating said cutting and forming dies.

13. In a mechanism for producing glass blocks with wire inserts, a pair of relatively movable dies between which the block is formed from plastic glass, means for operating said dies, and means for removing the formed block from over the die, said means comprising a reciprocating member provided with gripping means adapted to grip the wires below the formed block, and a container into which the formed block is deposited by said gripping means.

In witness whereof, we hereunto subscribe our names this 2nd day of September, A. D. 1919.

ANNIS G. JILLARD.
STANLEY BRACKEN.